United States Patent [19]
Abidi et al.

[11] Patent Number: 5,684,796
[45] Date of Patent: Nov. 4, 1997

[54] METHOD AND APPARATUS FOR DETERMINING AND MAINTAINING AGENT TOPOLOGY INFORMATION IN A MULTI-SEGMENT NETWORK

[75] Inventors: Vasmi Abidi, San Jose; Paul Woodruff, Sunnyvale, both of Calif.

[73] Assignee: Bay Networks Group, Inc., Santa Clara, Calif.

[21] Appl. No.: 344,072

[22] Filed: Nov. 23, 1994

Related U.S. Application Data

[63] Continuation-in-part of Ser. No. 237,023, May 3, 1994, Pat. No. 5,432,789.
[51] Int. Cl.⁶ ............................................. H04J 3/24
[52] U.S. Cl. ........................ 370/389; 370/254; 370/392; 370/401
[58] Field of Search ...................... 370/92, 85.13, 370/58.1, 94.1, 60, 56, 85.2, 17, 85.9, 364, 389, 392, 394, 401, 402, 403, 422, 434, 445, 498, 252, 254

[56] References Cited

U.S. PATENT DOCUMENTS

| | | | |
|---|---|---|---|
| 3,646,274 | 2/1972 | Nadir et al. | 370/92 |
| 4,428,042 | 1/1984 | Niethhammer et al. | 370/92 |
| 4,608,684 | 8/1986 | Upp | 370/58.1 |
| 4,896,315 | 1/1990 | Felker et al. | 370/17 |
| 5,128,937 | 7/1992 | Khalil | 370/85.9 |
| 5,179,554 | 1/1993 | Lumicka et al. | 370/92 |
| 5,319,644 | 6/1994 | Liang | 370/92 |
| 5,420,857 | 5/1995 | Jurkevich | 370/94.1 |
| 5,426,637 | 6/1995 | Derby et al. | 370/85.13 |
| 5,432,789 | 7/1995 | Armstrong et al. | 370/92 |
| 5,450,408 | 9/1995 | Phaal | 370/85.13 |
| 5,530,808 | 6/1996 | Hammond et al. | 370/94.1 |
| 5,546,540 | 8/1996 | White | 370/85.13 |

*Primary Examiner*—Douglas W. Olms
*Assistant Examiner*—Shick Hom
*Attorney, Agent, or Firm*—Blakely, Sokoloff Taylor & Zafman LLP

[57] ABSTRACT

A multi-segment agent topology mechanism for use by multi-segment network devices in an Ethernet network. Topology information packets exchanged between topology agents in a network include segment identifier information as well as IP address of the sending agent. A device's topology agent maintains and updates topology information in topology tables which identifies interconnected network devices, such as concentrators and bridges, by IP address and segment identifier information as well as incoming slot and port information for eventual use by a network management system in evaluating a networks topology map, and in automatically determining changes in the network's topology.

26 Claims, 10 Drawing Sheets

FIG. 4(a)

| DEST MAC | SOURCE MAC | LENGTH | LLC DATA | FCS |
|---|---|---|---|---|
| 6 | 6 | 2 | SEE 4(b) | 4 |

BYTES

DESTINATION MAC = 0x010081000100 MULTICAST FOR FLATNET HELLO
0x010081000101 MULTICAST FOR SEGMENT HELLO

FIG. 4(b)

LLC DATA:

| DSAP = 0xAA | SSAP = 0xAA | CONTROL = 0x03 | SNAP DATA |
|---|---|---|---|
| 1 | 1 | 1 | SEE 4(c) |

BYTES

FIG. 4(c)

SNAP DATA:

| VEND ID = 0x000081 | PDU TYPE | HELLO DATA |
|---|---|---|
| 3 | 2 | SEE TABLE I |

BYTES

PDU TYPE = 0x01A1 FOR SEGMENT HELLO
0x01A2 FOR FLATNET HELLO

FIG. 6(a)

| DEST MAC | SOURCE MAC | LENGTH | LLC DATA | FCS |
|----------|------------|--------|----------|-----|
| 6 | 6 | 2 | SEE 6(b) | 4 |

BYTES

DESTINATION MAC = 0x010081000101

FIG. 6(b)

LLC DATA:

| DSAP = 0xAA | SSAP = 0xAA | CONTROL = 0x03 | SNAP DATA |
|-------------|-------------|----------------|-----------|
| 1 | 1 | 1 | SEE 6(c) |

BYTES

FIG. 6(c)

SNAP DATA:

| VEND ID = 0x000081 | PDU TYPE | HELLO DATA |
|--------------------|----------|------------|
| 3 | 2 | SEE 6(d) |

BYTES

PDU TYPE = 0x01A3

HELLO DATA:

| BRIDGE NUMBER | BRIDGE IP | BRIDGE MAC | BRIDGE TYPE | BRIDGE STATUS | NUMBER OF PORTS | HELLO PORT # | HELLO PORT TYPE | HELLO PORT STATUS |
|---|---|---|---|---|---|---|---|---|
| 2 | 4 | 6 | 1 | 1 | 1 | 1 | 1 | 1 |

BYTES

*FIG. 6(d)*

TABLE: NMM ENTRIES

| SLOT | PORT | IP ADDR | SEG ID | MAC ADDR | CHASSIS | BKPL | LOCAL SEG | CURR STATE |
|------|------|---------|--------|----------|---------|------|-----------|------------|
|      |      |         |        |          |         |      |           |            |
|      |      |         |        |          |         |      |           |            |
|      |      |         |        |          |         |      |           |            |
|      |      |         |        |          |         |      |           |            |

FIG. 7(a)

TABLE: BRIDGE ENTRIES

| SLOT | PORT | IP ADDR | BDG NUMBER | MAC ADDR | TYPE STATUS | NUM PORTS | HELLO PORT NUM | HELLO PORT TYPE | HELLO PORT STATUS | COMP BDG MAC 1 | COMP BDG MAC 2 |
|---|---|---|---|---|---|---|---|---|---|---|---|
| | | | | | | | | | | | |
| | | | | | | | | | | | |
| | | | | | | | | | | | |
| | | | | | | | | | | | |

FIG. 7(b)

METHOD AND APPARATUS FOR DETERMINING AND MAINTAINING AGENT TOPOLOGY INFORMATION IN A MULTI-SEGMENT NETWORK

RELATED PATENT APPLICATION

This application is continuation-in-part of U.S. Patent Application "Use of a Single Central Transmit and Receive Mechanism for Automatic Topology Determination of Multiple Networks", Ser. No. 08/237,023, filed May 3, 1994, and assigned to the assignee of the present invention, and now U.S. Pat. No. 5,432,789.

BACKGROUND OF THE INVENTION

1. Field of the Invention

The present invention relates to mechanisms for determining and maintaining topology information in a networking system. More particularly, the present invention relates to techniques for multi-segment devices connected to a multi-segment Ethernet networking system to collect and maintain topology information concerning interconnections to other such devices over all segments of a multi-segment network.

2. Art Background

It is now well-known in the computer arts that system and societal efficiencies are increased through the interconnection of data terminal elements (DTEs) through a network of data communications media. A configuration of interconnected DTEs that are within a close proximity, e.g., the same building, is known as a local area network (LAN). The physical manner in which the DTEs are interconnected is termed a LAN topology. Associated with a LAN topology is a protocol. A LAN protocol refers to the format in which data is transmitted and the rules by which data is transmitted and received over the network.

One widely utilized networking protocol in existence today is the Ethernet protocol. The Ethernet protocol requires each element in a data processing network to broadcast data packets to all other elements in the data processing network according to a defined data format. Included in the packet is information identifying a destination element which will recognize its address and respond to the broadcast packet. A more detailed description of Ethernet communications can be found with reference to the ISO/IEC Standard 8802-3 (1992).

As it has become desirable to interconnect more and more DTEs in a network, network concentrators (also termed intelligent hubs) have been provided in order to yield increased connectivity, internetworking and network management. U.S. Pat. No. 5,319,644 issued to Chao-Yu Liang and assigned to Bay Networks, Inc., describes as one example of a network concentrator, the LattisNet System 3000™ intelligent hub available from Bay Networks, Inc., of Santa Clara, Calif. To the extent necessary for teaching intelligent hubs or concentrators, that patent is incorporated herein by reference. In a system utilizing a concentrator, DTEs are coupled to the concentrator and the concentrator provides a common communication channel, or backplane, allowing for communication between the various DTEs. Multiple concentrators may be interconnected to represent a star-like network topology with each hub having sprouted therefrom a number of DTEs.

As network topologies have become more complex, it has become important for network administrators to be able to assemble as much information about a network's topology in as simple a manner as possible. U.S. Pat. No. 5,226,120 issued to Brown, et al. and assigned to Bay Networks, Inc., describes an apparatus and method for monitoring the status of a local area network. In the system disclosed therein, each concentrator in the network propagates information packets identifying itself to all concentrators to which it is connected. Further, each concentrator receives and forwards from and to all concentrators to which it is connected the information packets from other concentrators in the network. In this way, each concentrator is able to assemble and maintain tables identifying the interconnection information for that particular concentrator. A network management station (NMS) is then able to poll all of the concentrators for these tables for assembling the combined data to determine the topology of the overall network. The Brown patent teaches that each concentrator in the network must incorporate a network management module which is responsible for sending and receiving the topology data packets to connected concentrators and for assembling and maintaining the topology tables for each concentrator. U.S. Pat. No. 5,226,120 is hereby incorporated by reference.

The concentrators taught by U.S. Pat. Nos. 5,319,644 and 5,226,120 each incorporate a single, common backplane bus for data communications between all elements coupled to the concentrator. Future concentrators, such as the LattisNet System 5000™ intelligent hub available from Bay Networks, Inc., of Santa Clara, Calif. will be considered multi-segment devices. Instead of a single backplane data communications bus, a number of separate backplane buses, or segments, are provided. In addition, the host modules in the concentrator also may contain network segments. In one sense, these separate segments provide a communications media for separate networks. It is preferable to refer to them as separate segments of an overall single networking topology. Conceptually, it operates as though multiple networks share a common concentrator.

The topology mapping disclosure of U.S. Pat. No. 5,226,120 does not provide for the complete topology mapping of multi-segment networks wherein some network devices such as concentrators or other switches are themselves multi-segment devices. One reason for this is that according to conventional address assigning protocols, such as the internet protocol (IP), a concentrator will have a single IP address. This is true even though multiple network segments may be included in the same concentrator. FIG. 1(a) illustrates graphically one situation in which the topology mapping protocols taught by Brown, et al. break down for multi-segment devices. FIG. 1(a) illustrates a first concentrator 10 with a first network segment 11 and a second network segment 12. It is conceivable that the concentrator 10 could be coupled to a concentrator 20 through both segments 11 and 12 of the concentrator 10. As illustrated in FIG. 1(a), both network segments 11 and 12 are coupled to a single network segment 21 of concentrator 20. The topology agent of concentrator 10 (not shown) receives "hello" data packets from the same IP address and same segment (concentrator 20, segment 21) but through different slot/port inputs 14 and 15. The topology agent of concentrator 20 (not shown) receives hello data packets from the same IP address (concentrator 20), but from different segments (segments 11 and 12), and at different slot/port inputs 22 and 23.

FIG. 1(b) is another example wherein segments 11 and 12 of concentrator 10 are both coupled to segment 21 of concentrator 20, but this time through a switch 25. In this situation, the topology agent of concentrator 20 (not shown) receives hello data packets from the same IP address and through the same slot/port 24, but from different segments 11 and 12. The single segment topology handling protocols are not able to handle these situations wherein it was previously conventional to index topology tables solely by the IP address of an interconnected concentrator.

It would be desirable, and is therefore an object of the present invention, to provide a mechanism for the topology agent of multi-segment concentrators to be able to collect and maintain the necessary topology information from all connected concentrators, including segment information, for the purposes of being able to assemble a complete topology map of a network which includes important segment information.

SUMMARY OF THE INVENTION

A method and apparatus for identifying and maintaining in topology tables the interconnections of multi-segment network devices while preserving the segment information in the topology tables, is described. From the foregoing, it can be appreciated that existing topology mapping techniques for interconnected network devices are insufficient to account for the segment information of interconnected network segments between agents in a multi-segment network. Each device in the network includes a network management module (NMM) which serves as the topology agent for the device. In one embodiment of the present invention the particular network device is a concentrator. The topology agent for the concentrator includes a single transmit unit and a single receive unit which cycles through each of the segments associated with the concentrator for transmitting topology information and receiving topology information respectively, over each segment. In an alternative embodiment, each segment within a concentrator may be associated with its own transmit unit and receive unit.

The NMM is responsible for sending a topology packet, also referred to as a hello data packet, over each network segment associated with the concentrator. These hello packets are repeatedly sent over each network segment in a period referred to as the hello packet cycle time or transmit interval. The hello packet sent by the NMM from the topology agent to all interconnected topology agents over multiple segments includes, in addition to the network address of the agent, a unique identifier identifying the network segment over which the hello packet is being sent. The segment identifiers may be arbitrarily assigned as long as they are unique for each segment associated with the agent. In one embodiment, a protocol is established for uniquely identifying different kinds of segments present within a concentrator.

A topology agent's NMM also monitors over each segment the hello packets received from all interconnected topology agents and bridges in the network. Topology tables are maintained for each hello packet received and are indexed by both a network address of the sender as well as the unique segment identifier to provide for the case of duplicated segments from the same device sending a hello packet to one concentrator. The topology tables are further indexed by the slot and port information over which a hello packet is received by the device to cover the situation such as when a concentrator receives a hello packet from a single other concentrator and segment over two different slot/port locations.

The topology tables maintained by the NMM in a given multi-segment network device also include state information about the overall network which may be polled by a network management station for determining when a network change has occurred. This allows the network management station to collect the topology tables from all NMMs in the network for assembling an accurate topology map of the network.

Provisions are made by the NMM topology table maintenance routines for the possibility of lost hello packets when considering whether to remove or add entries into the topology tables according to received or not received hello packets. Such provisions ensure that reliable topology information is maintained by each NMM agent in the network, and unnecessary topology changes are not signaled.

There is also provided in the present invention a mechanism for selecting a single NMM in a multi-segment concentrator to be the topology master for the case where multiple NMMs are present in the concentrator. When an NMM powers up in a concentrator, it determines if another NMM in the concentrator is serving as topology master. If another NMM is serving as topology master, then the other NMMs allow that NMM to continue doing so. Where no NMM in a concentrator is currently acting as the topology master, an arbitrary decision mechanism is implemented for picking one of the NMMs to be the topology master. The remaining NMMs in the concentrator do not participate in the sending of hello packets, but are capable of receiving hello packets from interconnected concentrators and maintaining tables equivalent to those maintained by the topology master.

BRIEF DESCRIPTION OF THE DRAWINGS

The objects, features and advantages of the present invention will be apparent from the following detailed description in which:

FIGS. 4(a)–4(c) illustrate the information contained in topology information data packets in accordance with one embodiment of the present invention.

FIGS. 6(a)–6(d) illustrate the data packet layout for topology information data packets propagated by a network bridge.

FIGS. 7(a)–7(b) illustrate topology tables maintained by a topology agent in accordance with one embodiment of the present invention.

DETAILED DESCRIPTION OF THE INVENTION

Methods and apparatus are described for distributing and collecting topology information for interconnected network devices in a multi-segment network. Throughout this detailed description numerous specific details are set forth, such as data packet structures and communications protocols. Those of ordinary skill in the art will appreciate that the present invention may be practiced without such specific details. In particular, one embodiment of a multi-segment network concentrator with a defined number of backplane network segments and slots for plug-in modules is described. It should be understood that this is for the purpose of illustration and is not provided as a limitation in that the present invention may be implemented by other multi-segment network devices such as multiple port switches operating in a multi-segment network.

In some instances, well-known components, structures and techniques have not been described in detail in order to avoid obscuring the subject matter of the present invention. Reference is specifically made to U.S. Pat. No. 5,226,120 issued to Brown et al. on Jul. 6, 1993, (herein after "the Brown patent"), which discloses a single-segment network concentrator and an implementation of a network management module (NMM) suitable therefore. The present invention relates to functionality to be carried out by an NMM such as the one described in the Brown patent, but implemented for use in a multi-segment network device. Thus, although the present invention will primarily be directed towards the functionality which is implemented by a processor driven NMM, it will be appreciated by one skilled in the art that these functions may be implemented by any variety of programmable or dedicated hardware devices within a multi-segment network device including, but not limited to, discrete logic circuits, programmable logic or application specific integrated circuits (ASICs).

Figure 1A:
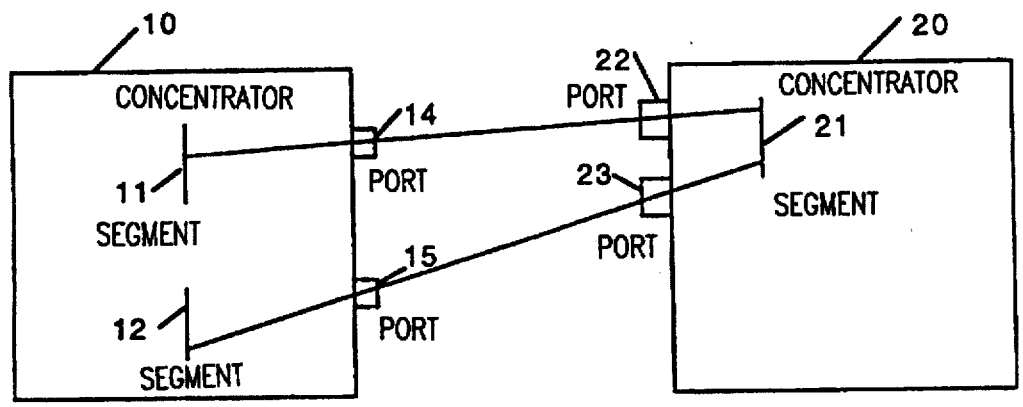
FIG. 1 illustrates a graphical example where prior topology mapping mechanisms fail for devices implementing multi-segment network capabilities.
Figure 1B:
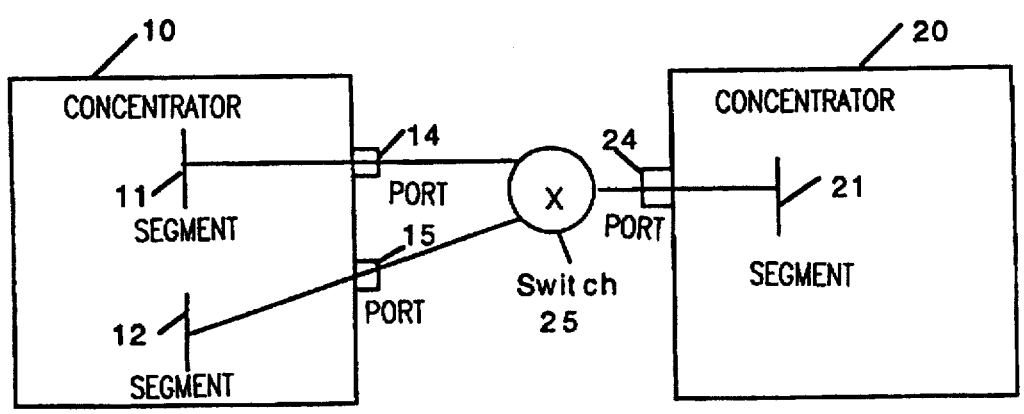
Figure 2:
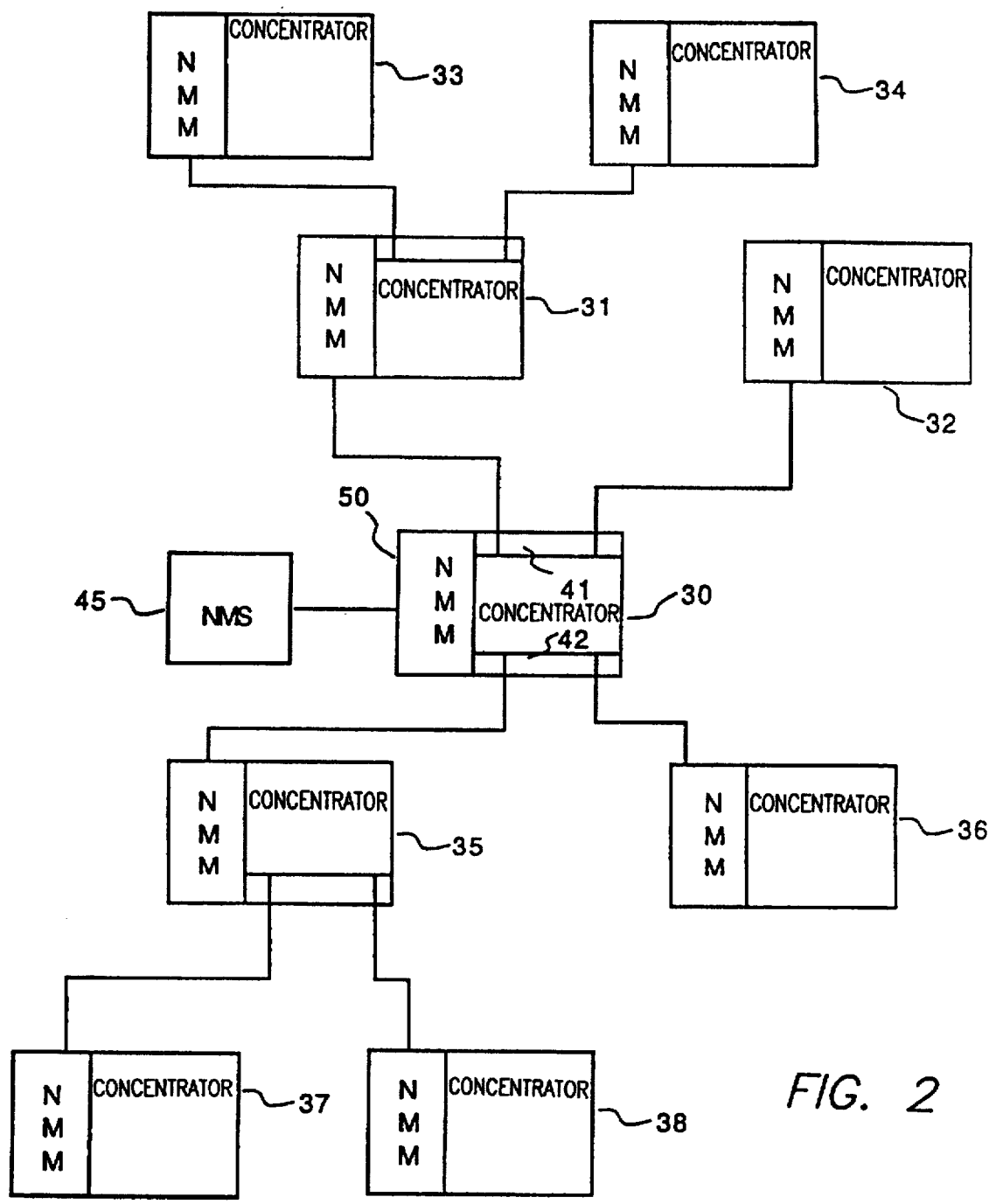
FIG. 2 is a schematic diagram of a local area network having a plurality of interconnected network concentrators.

Referring now to FIG. 2, there is represented a network of nine (9) interconnected concentrators. Unlike the concentrators described in the Brown patent, concentrator 30 comprises more than one backplane data bus. Instead, there are multiple network segments on the backplane of the concentrator of which two are illustrated as backplane segment 41 and backplane segment 42. Coupled to the concentrator 30, directly and indirectly, are other network concentrators 31, 32, 33 and 34. Concentrators 35, 36, 37 and 38 communicate with concentrator 30 through backplane segment 42. Thus, in one sense, the illustration of FIG. 2 shows two networks having a common node at concentrator 30. As described above, it is preferable to consider this as two distinct segments of the same network.

The concentrators 32 through 38 are not illustrated showing couplings to various data terminal elements, or other network devices being coupled thereto. It is to be understood that each of the concentrators is an intelligent hub to which multiple data terminal elements may be configured to complete the network picture. The functionality of the present invention is concerned with establishing the topology of the interconnected concentrators.

Each of the concentrators illustrated in the network of FIG. 2 has associated therewith a network management module (NMM). The NMM for each concentrator performs monitoring and controlling functions within the concentrator. For purposes of the present invention, the NMM functions concern sending topology information data packets (herein after referred to as "hello" packets), receiving hello packets from interconnected concentrators and bridges, and maintaining tables for each concentrator and network bridge in communication with the particular concentrator over the network. There is shown coupled to the concentrator 30 a network management system (NMS) 45. (Also referred to as a network management control console). This may in fact be a designated computer within the network that includes suitable control adaptors such as that described in the Brown patent. With each concentrator's NMM maintaining tables concerning its own interconnections, the NMS 45 may assemble a complete topology map of the network by retrieving each NMM's topology tables.

As noted above, the concentrators of interest are multi-segment network devices such as concentrator 30 in FIG. 2. In one embodiment of the present invention, the functionality to be carried out by the NMM 50 is for a concentrator which provides 12 independent network segments on its backplane. Further, the concentrator of that embodiment comprises 14 slots for receiving plug-in modules. It is envisioned that the NMM will occupy one of these slots leaving 13 dynamically configurable slots for receiving plug-in devices. It is also envisioned in one embodiment that plug-in host modules may be housed by each of the 13 slots wherein the host modules of the one embodiment themselves each provide 3 local network segments for configuring collections of the 24 ports for each host module. Further, the 24 ports may be configured as up to four (4) clusters of ports in a given slot. Thus, in one configuration, up to 52 network segments may be facilitated by a single concentrator.

Figure 3:
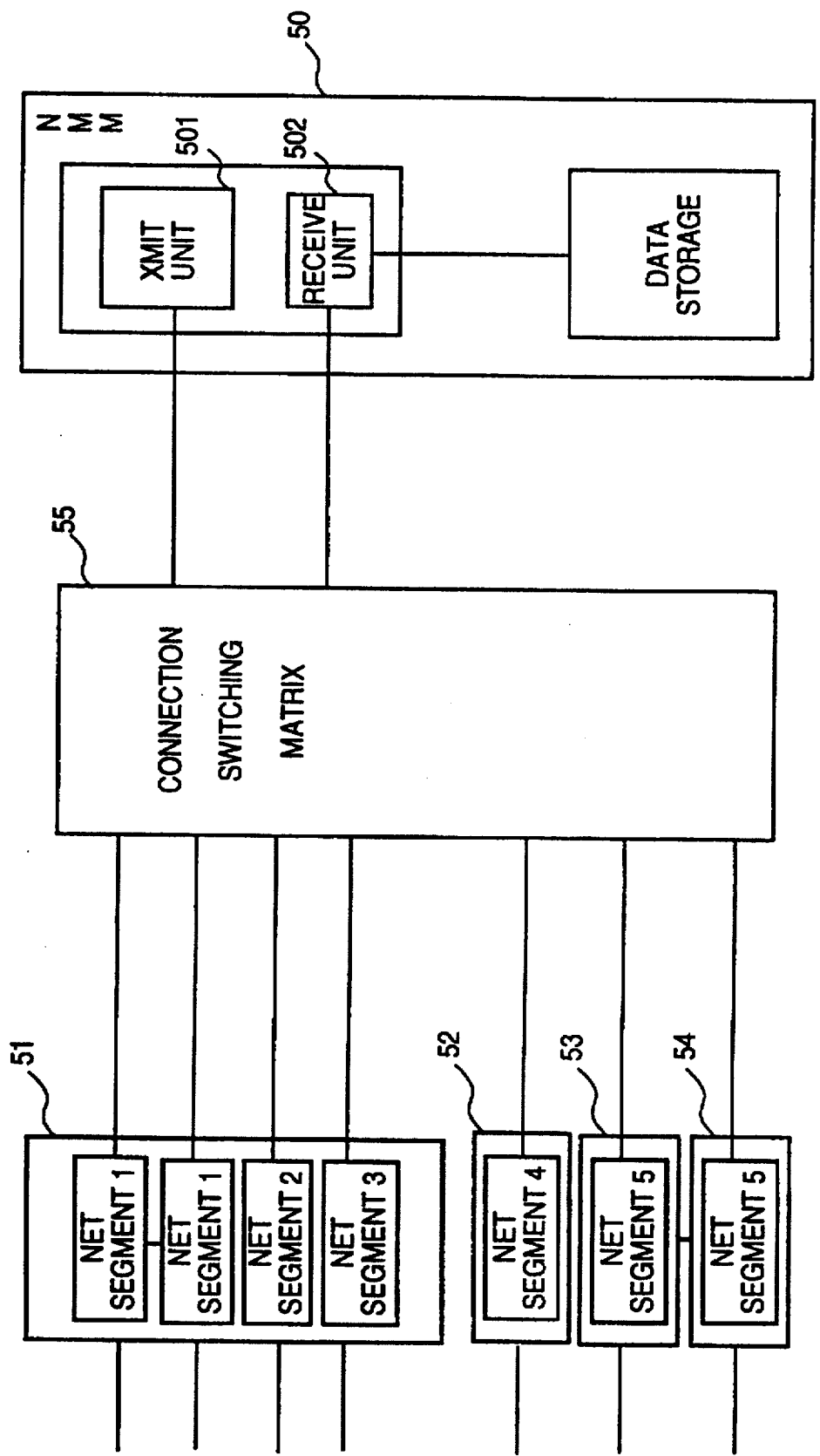
FIG. 3 illustrates a logical diagram for utilizing a connection switching matrix to allow the use of a single transmit unit and a single receive unit for broadcasting and receiving topology packet information over multiple network segments within a single network device as implemented by one embodiment of the present invention.

A network management module 30 has associated with it both a transmit unit and a receive unit for sending and receiving data packets from the NMM over the network segment to which it is currently connected. Prior art systems such as that disclosed in the Brown patent required a separate NMM for each network segment (they were in fact single segment devices). Co-pending U.S. Patent Application "Use of a Single Central Transmit and Receive Mechanism for Automatic Topology Determination of Multiple Networks", Ser. No. 08/237,023, invented by Michael Armstrong and assigned to the assignee of the present invention discloses a method and apparatus for using a single transmit and receive unit in an NMM in a concentrator which supports multiple network segments. Referring now to FIG. 3, a diagram logically equivalent to the arrangement for sharing a NMM transmit unit 501 and receive unit 502 over multiple network segments as that of the above-referenced co-pending patent application is illustrated. The transmit and receive units 501 and 502 are coupled to the backplane network segments through a connection switching matrix 55.

The diagram of FIG. 3 is illustrated to show how multiple network segments can be associated with a single slot in the concentrator chassis such as slot 51 which has associated therewith network segments 1, 2 and 3. Further, a single slot such as slot 52 may be associated with a single network segment such as network segment 4. Finally, multiple slots such as slots 53 and 54 may be associated with a single network segments. The teaching of the above-referenced co-pending patent application is that the connection switching matrix 55 allows the use of the single transmit and receive units by having them cycle through each of the network segments for a predetermined amount of time. This allows the functionality of the present invention to be executed by an NMM having a single transmit unit and receive unit. Of course, in an alternative embodiment of the present invention that is simpler to implement but much more expensive, distinct transmit units and receive units may be associated with each network segment associated with a given concentrator.

The illustration of FIG. 3 only serves to show the logical equivalent of what the above-referenced co-pending application implements. In that implementation, in addition to the 12 backplane segments associated with the concentrator, there is a topology transmit channel and a topology receive channel. Data packets transmitted by the NMM on the topology transmit channel will be broadcast over the segment connected to the topology transmit channel. Likewise, packets received on a segment that is connected to the topology receive channel are received by the NMM.

It was noted above that previously it was sufficient for the purposes of mapping a network's topology to propagate hello packets between network devices identifying the source of the hello packets solely by the IP address (unique network address) of the device from which it originated. With multi-segment devices, this is no longer sufficient because it fails to identify the particular network segment over which a hello packet is sent wherein a single network device may be associated with more than one segment of the network.

In accordance with one embodiment of the present invention, a NMM for a concentrator is responsible for propagating hello data packets over all network segments associated with the concentrator. Note that it is possible for a concentrator to have more than one NMM. In that situation, only one of the NMMs will be designated the topology master or topology agent. The method for making this determination will be described in more detail further herein. In accordance with one embodiment of the present invention where the topology agent must utilize a single transmit and receive unit to communicate over each network segment associated with the concentrator, the transmit unit will cycle through each of the network segments and propagate hello packets over each network segment once for every predetermined amount of time. This predetermined amount of time may be referred to as a transmit interval or a hello interval. In one embodiment of the present invention, the transmit unit will transmit a hello packet once every ten seconds over each network segment. Each concentrator in the network will have a topology agent whose transmit unit also transmits hello packets over each network segment associated with its concentrator once for every transmit interval.

The topology agent for a multi-segment network concentrator having a single receive unit will cycle the receive unit through each of the network segments such that the receive unit monitors each network segment for a period slightly longer than the transmit interval. In this way, the receive unit is guaranteed to hear from each of the other concentrators transmitting hello packets over the network segment for any given transmit interval.

Referring now to FIGS. 4(a)-4(c), the constituents of a hello data packet propagated by topology agents throughout the multi-segment network are described with respect to one embodiment of the present invention. These hello packets are the data packets transmitted by the topology agent associated with each concentrator in the network. Described further herein will be the hello data packet propagated by bridges within the network.

FIG. 4(a) illustrates the complete hello data packet propagated by a topology agent for a network concentrator. The first three fields, destination Media Access Control (MAC) address, source MAC address, and length constitute header information. The MAC addresses are the globally unique identifiers for the destination node and the source node in the network. Concentrators within the network actually propagate two hello packets back-to-back, referred to as a flatnet hello and a segment hello. This is done because bridges are designed to drop the segment hellos thus providing a mechanism for identifying bridges within the network. In one embodiment of the present invention, the destination MAC address is varied to indicate the difference between a flatnet hello and a segment hello. Following the destination and source MAC addresses, a two byte field is provided to identify the length of the entire data packet excluding header information and checksum data. In this illustrated embodiment, the length of hello packets propagated by concentrator topology agents is 19 bytes excluding header and checksum data. Following the length field is a 19 byte data field which will include the hello and control data to be described below. In the illustrated embodiment, this is referred to as Logical Link Control (LLC) data. The LLC data and its constituent portions will be described in more detail below with respect to FIGS. 4(b) and 4(c). Following the LLC data is a four-byte field with checksum information which may be utilized by the receiving node to verify the integrity of received data packets.

Referring now to FIG. 4(b), the LLC data portion of a hello data packet is illustrated in more detail. The first two bytes constitute destination Service Access Point (SAP) and source SAP set equal to 0XAA. According to IEEE Standard 802.3, this indicates that the particular protocol will be indicated by the 5 bytes labeled vendor ID and PDU type. This is followed by 1 byte of control information and 16 bytes of the sender's pertinent information. This is shown in more detail in FIG. 4(c) in which it can be seen the first 3 bytes of this information comprise a vendor ID code, for example, 0X000081 which corresponds to a value indicating SynOptics Communication, Inc., of Santa Clara, Calif. This is followed by two bytes of data indicating a PDU type which in one embodiment is varied for segment hellos and flatnet hellos. This is followed by the 11 bytes of hello data which are of interest for purposes of the present invention. Table I below illustrates the byte assignment for the hello data in accordance with one embodiment of the present invention:

TABLE I

| Field Name | Bytes | Value |
| --- | --- | --- |
| IP Address | 4 | IP address of sender |
| Segment Identifier | 3 | Sender's segment identifier |
| Chassis Type | 1 | Sender's chassis type |
| Backplane Type | 1 | Sender's backplane type |
| NMM State | 1 | Sender's NMM state |
| Reserved | 1 | Reserved |

The first four bytes of the hello data packet constitute the IP address of the sending concentrator. In accordance with one embodiment of the present invention, the IP address constitutes the conventional internet protocol address for the sender within the network. The next three bytes of data identify the segment of the network associated with the concentrator for which the current hello packet has been sent. As was described above, a single concentrator may be associated with multiple segments of the network. This is true, although the single concentrator will have a single IP address. Each network segment associated with a single IP address must have a unique segment identifier field. The protocol for establishing unique segment identifier information in accordance with one embodiment of the present invention will be described below.

The final four bytes of data in the hello packets sent by a concentrator comprise a one-byte code identifying the sending concentrator's chassis type. This may be followed by a one byte value indicating the backplane type or be a reserved byte. The next byte is a one-byte field identifying the state of the sending topology agent's concentrator. The function of the topology agent's state value in the hello packet will be described further herein with respect to providing a mechanism for telling the network management system when a new topology map needs to be assembled. Finally, following the NMM state value is another reserved byte that should be set to zero. It should be borne in mind the above description of bit designations within the hello data packet are for illustrative purposes and that alternative configurations of data within a hello packet may be envisioned by those of ordinary skill in the art.

As has been described, each network segment associated with a given network device must be provided with a unique segment identifier. When the transmit unit cycles over each network segment associated with the concentrator broadcasting flatnet and segment hellos, the data in each hello packet will be identical except for the segment identifier field, and possibly the source MAC address. In accordance with one embodiment of the present invention and suitable for use in the above described concentrator having 12 backplane segments and an ability to receive multiple host modules each having local segments, a protocol for designating a three-byte segment identifier field is as follows: the format for this segment identifier is Nxxyyy. For backplane segments within a concentrator, the value of N is 6. For backplane segments, xx is undefined, and the yyy identifies which backplane segment the hello packet is being broadcast over. A leading value of N=3 determines that the hello packet is being sent from a local segment of a host plugged into a slot. The xx denotes which slot in the concentrator the host module is plugged into and the yyy denotes which local segment is involved. A leading value of N=7 denotes an isolated cluster plugged into a slot. The value of xx indicates the slot in the concentrator and yyy identifies the particular cluster. Of course, other mechanisms may be defined for designating a unique segment identifier for each segment associated with a given concentrator.

Figure 5:
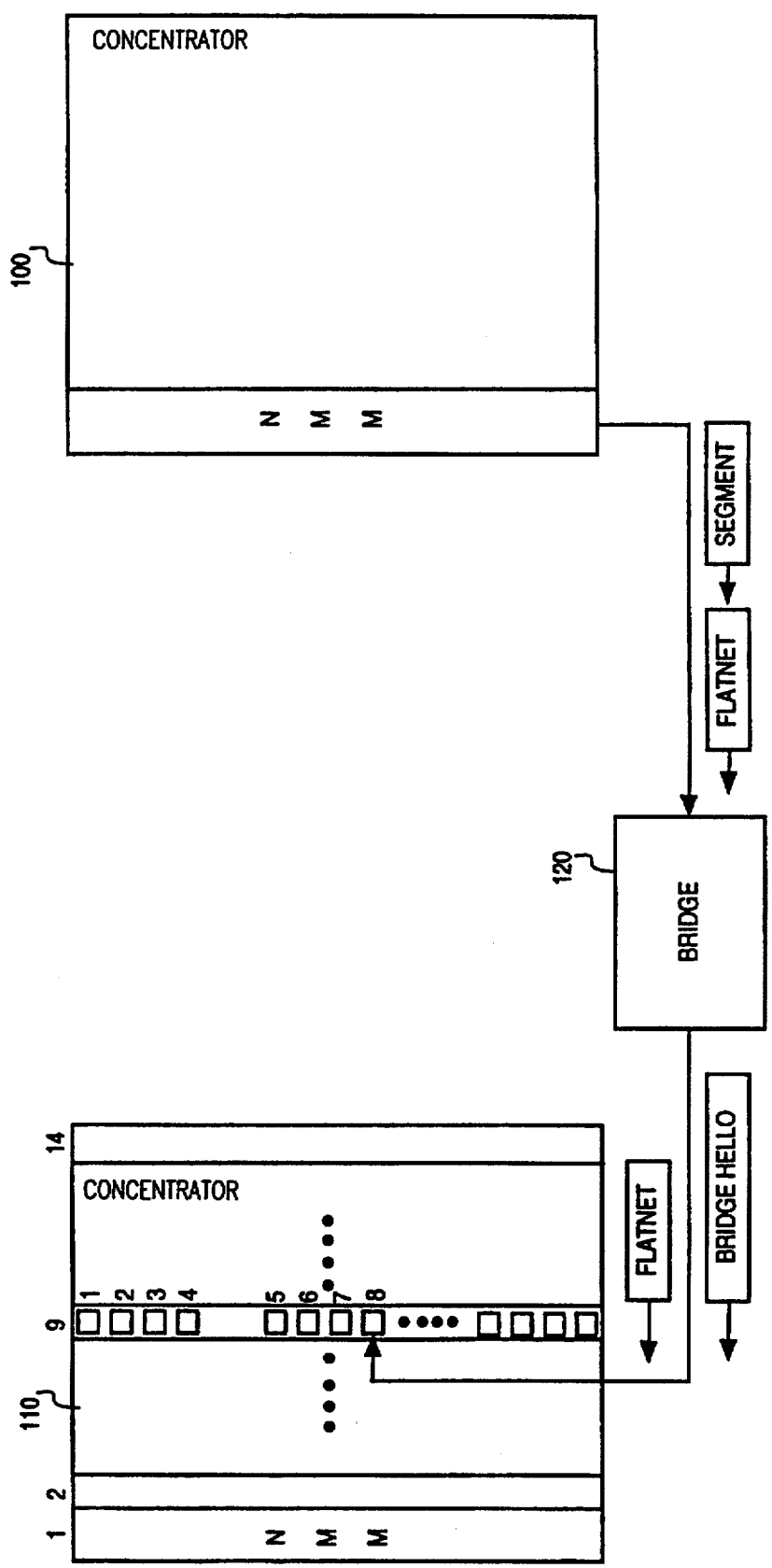
FIG. 5 illustrates a portion of a network wherein two network concentrators are interconnected through a network bridge.

Referring now to FIG. 5, a portion of a network is illustrated in which two concentrators are connected with an intervening network bridge. The following example assumes that the topology agent NMM of concentrator 100 is propagating the hello packets as described above over a particular network segment. One of the network segments associated with concentrator 100 is configured to be coupled with concentrator 110 through a host module plugged into slot 9 of the concentrator 110 at port 8. There is a bridge 120 coupled between the two concentrators. As can be seen, the concentrator 110 propagates both a flatnet hello and a segment hello over the involved segment. Both hello packets are received by the bridge 120 which only forwards the flatnet hello to the concentrator 110. This allows for the gathering of information which suggests an intervening bridge between the concentrator 100 and the concentrator 110.

Still referring to FIG. 5, it can also be seen that bridges propagate hello packets to the concentrators to which they are connected. FIGS. 6(a)–6(d) illustrate the constituents of a hello packet propagated by a bridge. FIG. 6(a) shows the complete data packet which comprises destination and source MAC address and a 2 byte length field similar to those described above with respect to hello packets propagated by concentrators in the network. The packet is concluded with four bytes of checksum information. In FIG. 6(b), it can be seen that the LLC data of the bridge hello data packet comprises three bytes of DSAP, SSAP and control data bytes as defined by IEEE Standard 802.3. This is followed by the particular information about the bridge in question.

FIG. 6(c) illustrates the pertinent bridge data as three bytes indicating a vendor ID and PDU type wherein the PDU type is defined to identify that the sending agent is a bridge. The hello data is defined in more detail with respect to FIG. 6(d). The hello data for a bridge comprises two bytes of information identifying bridge number, four bytes identifying the bridge's IP address according to the conventional protocol followed by six bytes identifying the bridge MAC. The following information includes the bridge type, bridge status, number of ports, the hello port number from which the hello packet is being sent, the hello port type and the hello port status. This, of course, is in accordance with one embodiment of the present invention and may be varied as seen fit for a particular application.

In addition to sending hello packets once every transmit interval for each segment associated with a concentrator, the topology agent for each concentrator monitors the topology receive channel of the concentrator's backplane in accordance with the above described embodiment of the present invention. The receive unit monitors each segment for a period of time slightly longer than the defined transmit interval to ensure receiving every hello packet (except dropped ones) sent over the network segment which is being monitored for a given interval period. Such an amount of time might be 10.1 seconds when the transmit interval is defined as 10 seconds.

The topology agent maintains topology tables identifying received hello packets. When a hello packet is received, the topology agent notes which slot and port the hello packet arrived through. FIG. 7(a) illustrates a table and the information maintained for each NMM which sends a hello packet to a given topology agent. FIG. 7(b) illustrates a table of entries for each bridge transmitting a hello packet to the topology agent. NMM entries are indexed by slot and port information, the IP address of the sender and the segment identifier for the hello packet received. This is a unique combination of variables for each possible entry in the topology tables.

In general, when a hello packet is received, its information is compared with the existing entries in the topology tables maintained by the topology agent. If there is no entry in the topology tables corresponding to the hello packet identification for a slot/port, IP address and segment identifier, then an entry is added to the table of entries for NMM senders. In a similar manner, entries are added to the bridge topology table. There can be multiple entries in the topology tables of the present invention for NMMs having the same IP address because the tables in accordance with one embodiment of the present invention are indexed by both IP address and segment identifier as well the slot and port over which the hello packet was received.

In the NMM entries table of FIG. 7(a), it can be seen that a value is maintained called "Local Seg". That value is set to true if for that entry both a flatnet hello and a segment hello were received. Otherwise, it is false. A true setting implies that there was no intervening bridge encountered by the hello packet resulting in the entry.

Entries are removed from the topology tables when the sending agent no longer sends hello packets to the topology agent maintaining the table. To account for the possibility that some hello packets get dropped over the network, the present invention implements a delayed delete principle. An entry is only deleted from a table when, after cycling through all the segments for monitoring purposes three times, no hello packet is received corresponding to a particular entry in the topology tables. In that case, there is a high probability that the sender has been removed from the network. For some cases, it is not necessary to implement the delayed delete function. For concentrators or bridges that are immediately coupled to the concentrator of interest, with no intervening nodes, if no hello packet is received in a first cycle and it is determined that no link is coupled to the previously occupied slot/port, then it can be assumed that that link has been removed and that entry from the table may be immediately deleted. This optimization allows for more rapid detection of changes in the topology of the network.

The protocol of the present invention also implements a delayed add function for the case in which a concentrator interconnection is moved to a different slot/port. The old entry will still exist in the table due to the delayed delete. To overcome this, the new entry for the IP/segment should be added to the table after the old entry has been deleted. All other additions to table entries are done as soon as a new hello packet is received.

In addition to sending and receiving hello data packets and maintaining topology information tables, the present invention also provides a mechanism for notifying the network management system (NMS) when the overall network's topology map needs to be updated. As has been described, the tables maintained by one NMM or topology agent in one concentrator do not provide the entire network picture. They will identify all network connections as they are seen by the given concentrator with reference to incoming slot and port information. It is only by assembling the topology tables from each topology agent that the complete network topology map may be drawn. In addition to maintaining the topology tables, the topology agent in each concentrator will also maintain two variables. One is referred to as the "NMM state" variable and the other is the "last change time" variable.

The NMM state variable for a given topology agent will change whenever there is an addition or deletion or a segment change for an agent within the agent's topology table. Initially the NMM state variable is in the "new state" state for three cycles through monitoring of all incoming hello packets. While in the new state, the NMM only receives hello packets but does not send any. From this it can assemble an initial set of topology tables. From the new state, the topology agent transitions to the "heartbeat" state where monitoring of incoming hello packets is performed. The topology agent transitions to a "topology change" state upon the entry insertion or deletion within the topology tables. It remains in the topology change state for six hello intervals. This is an arbitrary period long enough so that other NMMs in the network are assured of learning about the changed state taking into account that some packets may be dropped.

Figure 8:
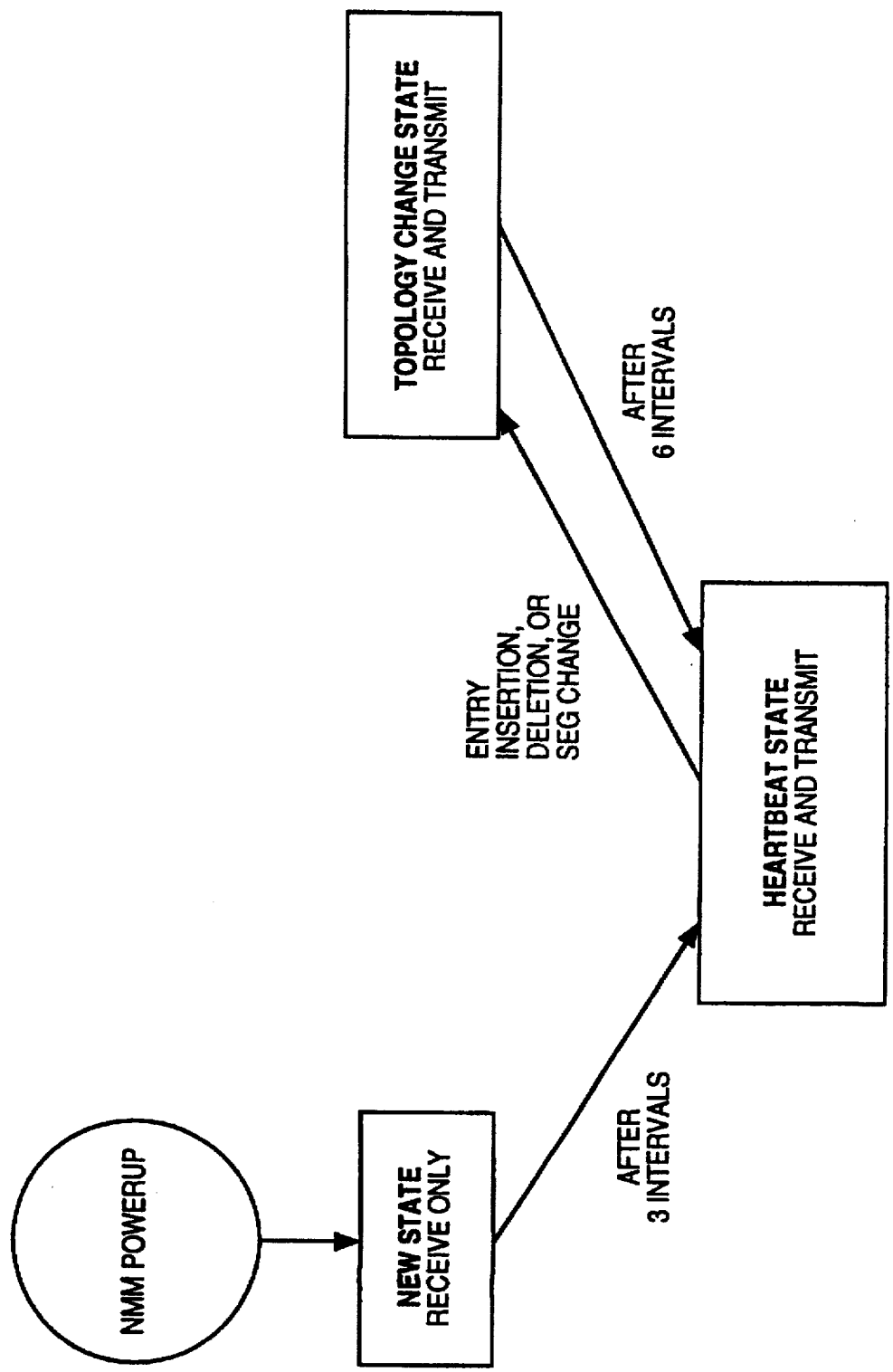
FIG. 8 discloses a state transition diagram for a topology agent undergoing state transition indicative of topology changes.

When a topology agent transmits its hello packet, it also transmits the NMM state variable. This is stored in the tables of all receiving topology agents (FIG. 7(a)). Each topology agent also maintains a variable which is called "last change time". Whenever a topology agent changes state, its own time last change state variable is updated. Further, whenever a topology agent receives a hello packet from an agent indicating that the sender's state has changed to "topology change" state, it updates its last change time value. The NMS coupled to any agent may determine if the last change time variable has changed since the last assembly of a topology map. If it has, the NMS knows that it needs to go out and collect all the topology tables for each topology agent to assemble the new accurate topology map. FIG. 8 illustrates the state diagram transitions for the NMM state variable for a given topology agent.

The above discussion of the hello packet transmit and receive protocol has assumed a single topology agent within a given network device. It is possible for some concentrators to be configured with multiple network management modules. In accordance with the present invention, only one of these NMMs should serve as topology agent for the concentrator. In accordance with one embodiment of the present invention, the arbitration for determining which NMM serves as topology agent is as follows: when an NMM powers up in a concentrator having multiple NMMs, it determines if another NMM is already performing the function of topology agent. If the concentrator already has a topology agent, the newly added NMM makes no effort to perform these functions. Note, however, that the NMM may monitor the topology receive channel for receiving hello data packets and may maintain topology tables in accordance with the received hello data packets. These topology tables should mirror exactly the topology tables maintained by the topology agent NMM. This useful redundancy is another facet of the present invention.

If an NMM powers up in a concentrator that has multiple NMMs and none of them are serving the topology agent function, then an arbitrary decision technique is implemented to assign one of them to that function. In accordance with one embodiment of the present invention, the NMM in the highest numbered slot takes on the role of topology agent. In alternative embodiments of the present invention, alternative selection mechanisms may be implemented for determining which NMM should function as topology agent. Various alternatives will be appreciated by those of ordinary skill in the art.

There has thus been described methods and apparatus for implementing the propagation and maintenance of topology information by topology agents implemented in multi-segment network devices. Although the present invention has been described in terms of various and illustrated embodiments, those of ordinary skill in the art will appreciate that various modifications and alterations might be made. Accordingly, the scope and spirit of the present invention should be determined in accordance with the claims which follow.

What is claimed is:

1. A method of broadcasting topology information from a network management module of a network device, the network device supporting a first network segment and a second network segment and having a network address, said method comprising the steps of:

(a) transmitting a first topology information packet from said network management unit over said first network segment, said first topology information packet including said network address identifying said network device and a first segment identifier identifying said first network segment; and (b) transmitting a second topology information packet from said network management unit over said second network segment, said second topology information packet including said network address identifying said network device and a second segment identifier identifying said second network segment.

2. The method of claim 1 wherein said first network segment is of a first segment type and said second network segment is of a second segment type, said first segment type being different from said second segment type, said method comprising the step of including information identifying said first segment type in said first segment identifier.

3. The method of claim 2 comprising the step of including information identifying said second segment type in said second segment identifier.

4. The method of claim 1 wherein at least one of said first or said second information topology information packets comprises a flatnet hello data packet, and said method includes the step of transmitting a segment hello data packet following said flatnet hello data packet.

5. The method of claim 4 including the steps of:
forwarding said flatnet hello data packet over a bridge within a network; and
dropping said segment hello data packet at said bridge within said network.

6. The method of claim 1 comprising the steps of:
updating said first and second topology information packets to reflect network topology changes, if said network topology changes have occurred; and
periodically repeating steps (a) and (b).

7. The method of claim 6 wherein said updating step comprises including a topology state variable in said first and second topology information packets, the value of said topology state variable being maintained by said network device to reflect changes in network topology.

8. The method of claim 6 wherein said step of periodically repeating steps (a) and (b) comprises the step of periodically connecting and disconnecting said network management module to each of said first and second network segments via a topology transmit channel associated with said network device.

9. The method of claim 6 wherein said step of periodically repeating steps (a) and (b) comprises the steps of:
specifying said first network segment for transmission of said first topology information packet; and then
specifying said second network segment for transmission of said second topology information packet.

10. The method of claim 1 wherein said network device includes a further network management module, said method including the steps of:
determining whether a predetermined condition with respect to said further network management module is met; and
performing steps (a) and (b) when said predetermined condition is not met.

11. The method of claim 10 wherein said step of determining whether a predetermined condition is met comprises determining whether said further network management module is actively performing steps (a) and (b).

12. The method of claim 10 wherein said step of determining whether a predetermined condition is met comprises determining whether said further network management module is capable of performing steps (a) and (b), and whether said further network management module is located in a higher numbered slot of said network device than said network management module.

13. A method of maintaining a topology information table in a primary network device in a multi-segment network, said primary network device supporting at least one network segment, said multi-segment network including a secondary network device, and said secondary network device supporting a plurality of network segments, the method comprising the of:
(a) monitoring said at least one network segment for a topology information packet from said secondary network device;
(b) receiving said topology information packet at said primary network device, said topology information packet identifying said secondary network device and one of said plurality of network segments over which said topology information packet was transmitted; and
(c) maintaining said topology information table in accordance with said topology information packet to identify said secondary network device from which said topology information packet was received, and to identify said one of said plurality of network segments over which said topology information packet was transmitted.

14. The method of claim 13 wherein said primary network device has a plurality of slots, each slot having a plurality of ports through which said topology information packet is receivable at said primary network device, the method including the step of maintaining said topology information table to identify one of said plurality of slots and one of said plurality of ports through which said topology information packet was received.

15. The method of claim 13 wherein said multi-segment network includes at least one bridge, the method including the step of maintaining separate topology information tables for said secondary network device and for said at least one bridge.

16. The method of claim 13 including the step of maintaining a topology change state variable which indicates whether network topology associated with said primary network device has changed.

17. The method of claim 16 including the steps of:
setting said topology change state variable from an initial value to a value indicative of a change in network topology when said topology information table is modified; and
reverting said topology state variable to said initial value after a predetermined period.

18. The method of claim 13 including the steps of:
maintaining a last change time variable;
updating said last change time variable when entries are added to or deleted from said topology information table; and
updating said last change time variable when said topology information packet includes a topology change state variable indicating that said secondary network device has detected a network topology change.

19. The method of claim 13 wherein said primary network device supports a further network segment, the method including the additional steps of:
(a) monitoring said further network segment for a topology information packet from said secondary network device;
(b) receiving said topology information packet at said primary network device, said topology information packet identifying said secondary network device and one of said plurality of network segments over which said topology information packet was transmitted; and
(c) maintaining said topology information table in accordance with said topology information packet to identify said secondary network device from which said topology information packet was received, and to identify said one of said plurality of network segments over which said topology information packet was transmitted.

20. A method of monitoring topology information utilizing a primary network device in a multi-segment network, said primary network device having a network management module and supporting first and second network segments, and said multi-segment network including a secondary network device having a network address, the method comprising the steps of:
(a) monitoring said first network segment for a first topology information packet from said secondary network device, said first topology information packet including said network address identifying said secondary network device and a network identifier identifying a network segment supported by said secondary network device;

(b) monitoring said second network segment for a second topology information packet from said secondary network device, said second topology information packet including a network address identifying said secondary network device and a further network identifier identifying a network segment supported by said secondary device; and (c) maintaining a topology information table in accordance with the first topology information packet to identify said secondary network device and the network segment over which the first topology information packet was received by the primary network device from the secondary network device.

21. The method of claim 20 including the step of periodically repeating steps (a) and (b).

22. The method of claim 21 wherein the step of periodically repeating steps (a) and (b) comprises the step of periodically connecting and disconnecting said network management module to each of said first and second network segments via a receive channel associated with said primary network device.

23. The method of claim 20 including the step of simultaneously monitoring said first and second network segments.

24. A network management module for use in a network device within a multi-segment network, said network device supporting a first network segment and a second network segment, and said multi-segment network including a remote network device, the network management module comprising:

(a) a transmit unit arranged periodically to transmit:
   a first topology information packet over said first network segment, said first topology information packet identifying said network device and said first network segment; and
   a second topology information packet over said second network segment, said second topology information packet identifying said network device and said second network segment;

(b) a receive unit arranged to monitor said first and second network segments for a remote topology information packet transmitted by said remote network device, and to receive said remote topology information packet transmitted from said remote network device; and (c) a data storage device arranged to maintain topology information tables in accordance with said remote topology information packet received from said remote network device.

25. The network management module of claim 24 including a plurality of slots, each slot having a plurality of ports over which said remote topology information packet is receivable, said topology information tables including information identifying through which slot and port said remote topology information packet was received.

26. The network management module of claim 24 wherein said network management module maintains topology state information for identifying network topology changes.

* * * * *